Sept. 17, 1968    J. R. REISS ET AL    3,401,959
THREADLESS PIPE FITTING WITH COMPRESSION SEAL
Filed Nov. 8, 1966    2 Sheets-Sheet 1

INVENTOR.
JOHN R. REISS
ROBERT J. BRIDIGUM
BY
*a. a. Steinmiller*
ATTORNEY

Sept. 17, 1968  J. R. REISS ET AL  3,401,959
THREADLESS PIPE FITTING WITH COMPRESSION SEAL
Filed Nov. 8, 1966  2 Sheets-Sheet 2
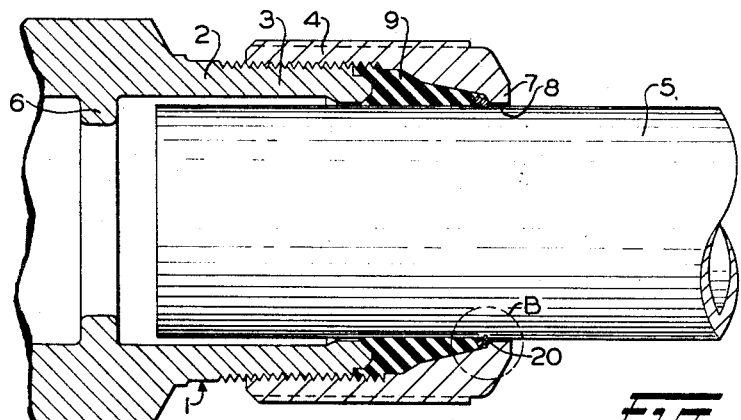
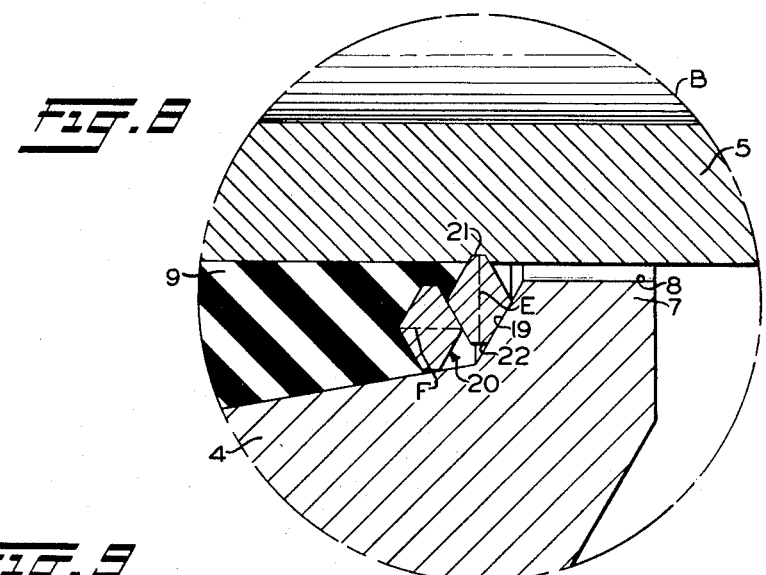
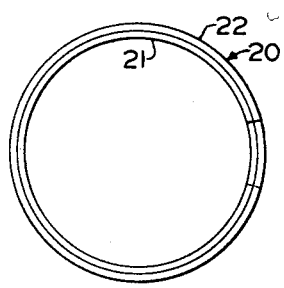
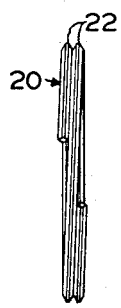
INVENTOR.
JOHN R. REISS
BY ROBERT J. BRIDIGUM
*A. A. Steinmiller*
ATTORNEY

United States Patent Office 3,401,959
Patented Sept. 17, 1968

3,401,959
THREADLESS PIPE FITTING WITH COMPRESSION SEAL
John R. Reiss, East McKeesport, and Robert J. Bridigum, Pittsburgh, Pa., assignors to Westinghouse Air Brake Company, Wilmerding, Pa., a corporation of Pennsylvania
Filed Nov. 8, 1966, Ser. No. 592,838
3 Claims. (Cl. 285—343)

ABSTRACT OF THE DISCLOSURE

A pipe joint fitting consisting of a body portion in which the end of a threadless pipe is inserted and onto which body portion a lock nut containing a rubber sealing gland and a resilient multi-turn locking helix is screwed for securing the pipe in place. The rubber sealing gland and the locking helix, each turn of which has a sharp edge formed on its inner and outer peripheries, are so arranged in the lock nut and in relation to the pipe that screwing of the lock nut onto the body portion, through cam surfaces complementarily formed on the lock nut and the locking helix, causes at least one turn of the helix to be circumferentially constricted until the sharp edge forming its inner periphery bites into the pipe surface to prevent axial displacement of the pipe from the fitting, while at least another turn of the helix adjacent the sealing gland is caused to be circumferentially expanded until the sharp edge forming its outer periphery makes contact with the inner surface of the lock nut to prevent extrusion or displacement of said sealing member from its sealing position on the pipe. With the locking helix under stress, the resiliency thereof maintains constant sealing pressure on the sealing gland.

---

Figure 3:
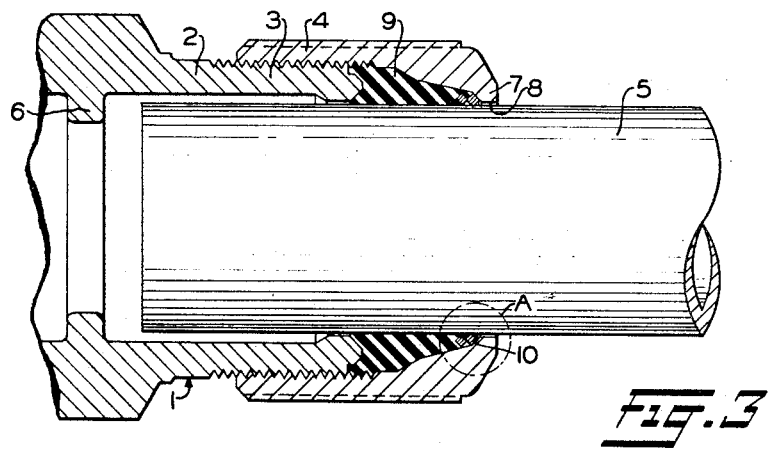

A common type of pipe joint fitting for threadless pipes comprises a cylindrical body portion into which the end of a pipe is inserted and then sealingly secured therein by a lock nut which is slipped over the pipe and has disposed therein an annular sealing member or gland usually of a resilient material such as rubber, said nut being adapted to be screwed onto the cylindrical body portion so that the sealing member or gland is compressed into a sealing and frictional gripping relation with the pipe. This common type of fitting does present several problems, however, one such problem being due to the viscous nature of the rubber sealing member. When the nut is screwed onto the cylindrical body portion for compressing the sealing member into sealing and gripping relation with the pipe, the rubber adjacent the open end of the nut by which it is slipped over the pipe, may be forced or caused to be partially extruded through the clearance between the pipe and said open end, thereby damaging said sealing member.

Moreover, when the sealing member is pressed into sealing relation with the pipe by screwing the lock nut onto the cylindrical body portion, said rubber sealing member, by necessity, is distorted out of its normal shape into a different shape in which it effects such sealing and gripping relation with the pipe. As is well known, rubber or similar resilient materials, when distorted out of a normal shape by extraneous forces applied thereon, normally resumes the normal shape when said extraneous forces are removed. On the other hand, when rubber is maintained in a distorted shape by extraneous forces acting thereon for a sustained period of time, the rubber may take a permanent "set" in the distorted shape notwithstanding the eventual removal of said extraneous forces. Since the force acting on the sealing member for pressing it into sealing relation with the pipe is provided by screwing the lock nut into position on the cylindrical body portion, said force is effective only as long as the rubber is "live," that is, retains its tendency to resume its original shape. Once the rubber sealing member becomes "set" in its distorted shape, the pressure between it and the lock nut is reduced so that said sealing member consequently loses its sealing and gripping effectiveness unless further pressure is applied thereon by further screwing of the lock nut onto the cylindrical body portion. Loss of gripping effectiveness may also permit the end of the pipe to slip out of the joint unless otherwise restrained.

The object of the present invention, therefore, is to provide a pipe joint fitting for threadless pipes characterized by self-energizing means for maintaing constant sealing pressure on the sealing member, for providing a permanent gripping effect on the pipe and for preventing extrusion and damage of the rubber sealing member.

Briefly, the invention resides in a pipe joint fitting which can be adapted, for example, to devices such as angle cocks, unions, and flange type fittings, and which comprises the usual cylindrical body portion for receiving the end of a threadless pipe. A sleeve type lock nut screws onto the cylindrical body portion for sealing and locking the pipe in said body portion. According to the invention the lock nut has a resilient sealing gland and a helically wound spring metal coil or lock ring comprising a plurality of turns so arranged therein that, upon tightening of the lock nut on the body portion, the lock ring applies pressure on the sealing gland to effect a seal against the pipe while at the same time the diameter of one turn of the lock ring is contracted to cause said turn to bite into the surface of the pipe and thereby prevent axial displacement of the pipe from the fitting. The lock ring, which is helically wound in a direction opposite to that of the threads of the lock nut, acts to prevent inadvertent loosening of the lock nut after being tightened into position, and is also so positioned relative to the pipe, the sealing gland and the lock nut as to prevent extrusion of any portion of said sealing gland through the clearance between the pipe and the opening in the lock nut surrounding said pipe.

Figure 1:
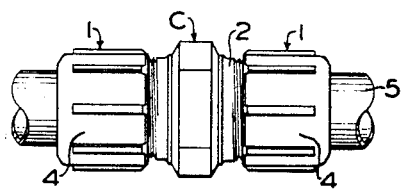
Figure 2:
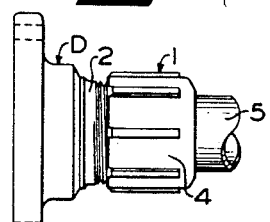
Figure 4:
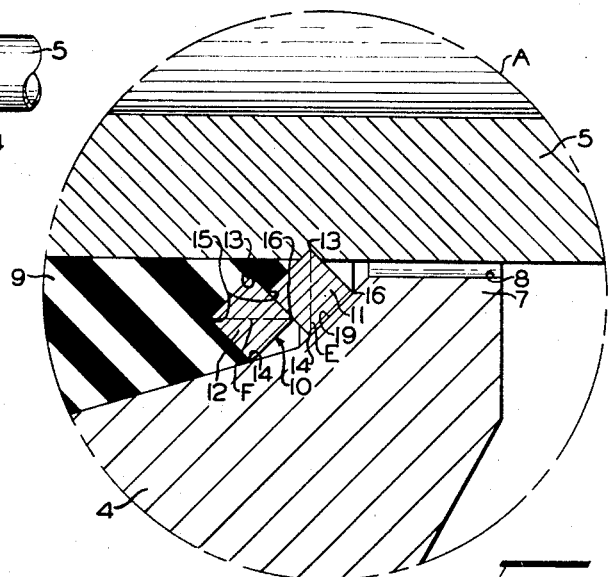
Figure 5:
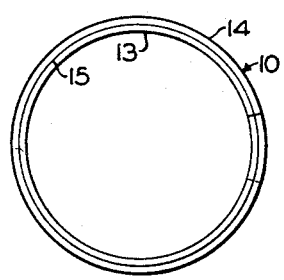
Figure 6:
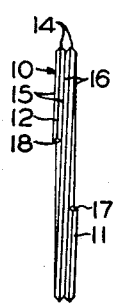

In the drawings, FIGS. 1 and 2 show, in outline, two types of devices in which the invention may be incorporated; FIG. 3 is a fragmentary sectional view, on a larger scale than FIGS. 1 and 2, of a pipe fitting portion of either of the devices shown in FIGS. 1 and 2 embodying the invention; FIG. 4 is an enlarged sectional fragmentary view, on a larger scale, of the area enclosed by circle A in FIG. 3; FIGS. 5 and 6 are front and side elevational views, respectively, of one component of the fitting shown in FIG. 3 and on the same scale thereof; FIG. 7 is a sectional view of a different form of the invention as shown in FIG. 3 and on the same scale; FIG. 8 is an enlarged sectional fragmentary view of the area enclosed by circle B in FIG. 7; and FIGS. 9 and 10 are front and side elevational views, respectively, of one component of the fitting shown in FIG. 7 and on the same scale.

DESCRIPTION AND OPERATION

FIGS. 1 and 2 of the drawings illustrate a union type pipe fitting device C and a flange type pipe fitting device D, respectively, which merely serve to illustrate two of many devices in which the invention herein disclosed may be employed, it being understood that such illustration is not intended to imply that the invention is limited to such use only.

FIG. 3 shows pipe fitting portions 1 of the pipe fitting devices C and D (the former having one such portion at each end) embodying one form of the invention, each of said pipe fitting portions being identical in structure and comprising a generally cylindrical body portion 2 having an externally screw-threaded end portion 3 for receiving a complementarily internally threaded sleeve type lock nut 4 by which the end of a pipe 5 is sealingly secured in said cylindrical body portion. An internal annular shoulder 6 formed in the cylindrical body portion 2 is provided for limiting the extent to which the pipe 5 may be inserted thereinto.

The lock nut 4, as previously noted, is internally threaded at one end for securement thereof to the cylindrical body portion 2, while the opposite end of said lock nut is in the form of a collar 7 having therein a concentric bore 8 of such diameter as to permit the pipe 5 to be inseretd therethrough before the lock nut is secured to said cylindrical body portion, but with a minimum of clearance between the collar and the pipe.

The end of the lock nut 4 adjacent the collar 7 is internally undercut to provide a space or recess between said collar and the extremity of the threaded end portion 3 of the cylindrical body portion 2, when the lock nut is screwed thereon, in which space an annular sealing gasket or gland 9, made of a resilient material such as rubber, for example, is disposed. The sealing gasket 9 is molded so as to generally conform with the contour of the space in which it is disposed.

According to the invention, locking ring or helix 10 is disposed coaxially within the lock nut 4 between the collar 7 and the sealing gland 9, so as to coaxially surround the pipe 5 when said lock nut is secured on the body portion 2. This structure may be seen more clearly in the enlarged fragmentary view of FIG. 4 wherein, for purposes of clarity, the wall of the pipe 5 is shown in section. The locking ring or helix 10, which is shown in FIGS. 5 and 6, comprises a coil in the form of a cylindrical helix having a plurality of turns in this instance two such turns 11 and 12 being shown, formed from square cross-sectional corrosion-resistant spring wire stock possesing a relatively high degree of hardness for a purpose to be hereinafter disclosed. As used herein the term "cylindrical helix" is understood to be a space curve generated by a point moving uniformly along a straight line while the line revolves uniformly about another line as an axis. In forming the locking ring or helix 10, the wire stock is so wound as to have one of the cross-sectional diagonals of each turn 11 and 12 disposed substantially perpendicular and the other diagonal of each turn disposed substantially parallel to the axis of the locking ring, said one and said other cross-sectional diagonals being designated by the reference characters E and F, respectively, in FIG. 4 of the drawings. Wound in the manner just described therefore, each turn 11 and 12 of the locking ring or helix 10 has formed thereon, relative to the axis of the locking ring, radially spaced internal and external radial edges or ridges 13 and 14 comprising the respective vertices at each end of the diagonal E, and axially spaced axial edges or ridges 15 and 16 comprising the respective vertices at each end of the diagonal F, so that adjacent axial ridges of adjacent turns of the helix are in a coincidingly abutting relation with each other in the relaxed or unstressed state of the locking ring. It should be evident, of course, that the axial ridges 15 and 16, as well as the radial ridges 13 and 14, form respective endless curved lines and not closed circles. The turns 11 and 12 of the lock ring 10 are wound in a direction (in this instance left-handed) opposite to that of the threads on the cylindrical body portion 2 and the lock nut 4, for a purpose to be hereinafter disclosed, each of said turns terminating with blunt ends 17 and 18, respectively.

In order to secure the pipe 5 in the cylindrical body portion 2, the lock nut 4 with locking ring 10 and the sealing gland 9 disposed therein, is first slipped over the pipe 5 through the bore 8 with the end of the lock nut adjacent said bore away from the end of the pipe. When the locking ring 10 is in a relaxed or unstressed state, the respective internal diameters of the turns 11 and 12 are slightly larger than the external diameer of the pipe 5, and when disposed coaxially in the lock nut 4, the conical surface formed between the ridges 14 and 16 of the turn 11 abuttingly contacts a complementarily beveled conical surface 19 formed internally of the collar 7 on said lock nut. After the locking ring 10 has been placed in the lock nut 4, the sealing gasket or gland 9 is then inserted into the lock nut coaxially therewith so as to be in surrounding relation to the pipe 5 which is then inserted into the open end of the body portion 2 until the end of the pipe abuts against the shoulder 6, or nearly so, whereupon the lock nut is screwed onto the externally threaded end portion 3 of said body portion.

As the lock nut 4 is tightened onto the cylindrical body portion 2, the locking ring 10, being wound in a left-hand direction, does not oppose such turning of the lock nut which has a right-handed thread, nor will the turning action of said lock nut cause the blunt end 18 of the coil 12 to dig into the rubber sealing gasket 9 while said lock nut is tightened into position. As the lock nut 4 is turned onto the cylindrical body portion 2, the relative displacement therebetween causes the beveled surface 19 on the collar 7 to effect a wedging action on the contacting conical surface of the adjacent turn 11 of the locking ring 10, so that a resultant force acting on said turn causes radial or circumferential constriction, as well as axial displacement, of the turn 11. Upon such radial constriction of the turn 11, the internal radial edge or ridge 13, due to the hardness of the metal making up such turn, is forced to bite into the external surface of the pipe 5, while such radial constriction, as well as the axial displacement of turn 11 in a left-hand direction as viewed in FIG. 3, causes said turn 11 to be partly forced within the diametral limits of the turn 12 so that the conical surface between the edges 14 and 15 of the turn 11 makes sliding contact with the adjacent conical surface between the edges 13 and 16 of the turn 12, thereby producing a radially outwardly directed biasing effect on the turn 12 for maintaining the external ridge 14 thereof in abutting contact with the inner surface of the nut 4.

When the lock nut 4, therefore, has been tightened onto the cylindrical body portion 2 into what may be called a sealing locked position, the locking ring 10, due to its spring quality, its being wound in a left-hand direction and its blunt ends 17 and 18, acts in a manner similar to a lock washer in resisting removal of said lock nut and therefore prevents inadvertent loosening thereof. Moreover, by having the ridge 13 of turn 11 bite into the pipe 5, as above described, the locking ring 10 serves to lock said pipe against axial displacement, and by being disposed between the rubber sealing gland 9 and the collar 7 with the ridge 14 of coil 12 in contact with the inner surface of the lock nut 4, said locking ring also serves to prevent extrusion of the rubber through the clearance between said collar and said pipe. As was described above, when the lock nut 4 is screwed onto the body portion 2, the turn 11 of the locking ring 10 is radially constricted and partly forced within the turn 12 with adjacent conical surfaces in abutting contact. Due to such radial constriction and its spring quality, the inner turn 11 tends to "unwind" so to speak, so as to exert a combined axially and radially outwardly directed biasing effect on the outer turn 12, the axial biasing effect being in a left-hand direction, as viewed in FIG. 4, to thereby maintain a constant sealing pressure on the sealing gland 9. In this manner, any loss of sealing pressure due to the rubber taking a "set," as hereinbefore discussed, is offset by the constant sealing pressure provided by the locking ring 10.

The second embodiment of the invention shown in FIGS. 7, 8, 9 and 10 of the drawings differs from that shown in FIGS. 1 through 6, above described, only in that a locking ring 20 utilized in said second embodiment is formed from corrosion-resistant spring wire stock having a generally diamond-shaped cross section, rather than the square cross section of locking ring 10, and having radially disposed (relative to the axis of the locking ring)

interal and external radial edges or ridges 21 and 22, respectively, which are slightly blunted rather than sharp as are the ridges 13 and 14 on the locking ring 10. The ridges 21 and 22, however, are not so blunt as to prevent the internal ridge 21, especially, from biting into the pipe 5, as shown in FIG. 8, for preventing axial displacement of said pipe. The purpose of showing the second embodiment of the invention in FIGS. 7 through 10 is to illustrate that in forming the locking ring, such as locking rings 10 and 20, the wire stock from which such locking rings are formed need not necessarily be limited to one having a particular cross section, such as the square cross section. The cross section of the wire stock from which the locking rings are made, should be such as to provide an internal ridge (corresponding to ridges 13 and 21) sufficiently sharp to bite into the surface of the pipe, and a conical face which may be contacted by the beveled surface 19 of the collar 7 when the lock nut 4 is tightened into position to effect a proper locking and sealing relation of the several components.

The embodiment shown in FIGS. 7 through 10 is assembled and functions in a manner identical to that described in connection with the embodiment shown in FIGS. 1 through 6.

Having now described the invention, what we claim as new and desire to secure by Letters Patent is:

1. In a pipe coupling, the combination of:
   (a) a body portion having a circular opening therein and external threads thereon,
   (b) a threadless pipe having one end disposed in said circular opening,
   (c) a lock nut screwthreaded at one end for removable securement to said external threads on said body portion in surrounding relation to and cooperating with said pipe to form an annular chamber between the outer surface of said pipe and the inner surface of the lock nut,
   (d) a resilient sealing member conforming substantially in shape to and disposed in said annular chamber in surrounding relation to said pipe, and
   (e) a resilient helical locking member having
      (i) an axially outer turn characterized by a sharp peripheral edge on the inner circumference thereof, and
      (ii) an axially inner turn,
   (f) said locking member being coaxially disposed in said annular chamber adjacent the other end of said lock nut opposite the screwthreaded end with the outer turn of said locking member in juxtaposition to said other end of the lock nut and the inner turn in juxtaposition to said sealing member,
   (g) said outer turn and said lock nut having formed thereon respective complementarily engaging cam surface means cooperable by securement of said lock nut onto said body portion for effecting circumferential constriction of said outer turn into a stressed condition and consequent biting of said sharp edge on the inner circumference thereof into the outer surface of said pipe for securing the pipe against axial displacement, and
   (h) said outer and inner turns having formed thereon respective complementarily engaging cam surface means cooperable by such securement of said lock nut onto said body portion for effecting circumferential expansion of said inner turn into a stressed condition and consequent contact of the outer peripheral edge of said inner turn with the inner surface of said lock nut for preventing extrusion of said resilient sealing member past the locking member,
   (i) said resilient locking member being effective in such stressed condition of said outer and inner turns for exerting a continuous pressure on said sealing member for urging the sealing member into gripping and sealing relation with the pipe.

2. The combination, as defined in claim 1, wherein said outer and inner turns of the helical locking member each has a rectangular cross-sectional area, said turns being so wound as to have one diagonal of said cross-sectional area disposed perpendicularly to the longitudinal axis of the locking member and the other diagonal disposed parallel to said axis so as to form angularly disposed annular faces on each of said inner and outer turns, the two adjacent annular faces on the respective turns cooperating in abutting contact to provide said complementarily engaging cam surface means for effecting said circumferential expansion of said inner turn.

3. The combination, as defined in claim 2, wherein said complementarily engaging cam surface means on said outer turn and on said lock nut for effecting constriction of the outer turn comprise an annular surface formed internally on said other end of said lock nut at an angle to the axis thereof and the adjacent annular face of said outer turn cooperating in abutting relationship.

References Cited
UNITED STATES PATENTS

| | | | |
|---|---|---|---|
| 1,711,995 | 5/1929 | Erickson | 285—318 |
| 1,959,607 | 5/1934 | Anderson | 285—348 X |
| 2,358,408 | 9/1044 | McMurray | 285—348 X |
| 2,698,191 | 12/1954 | Samiran | 285—341 X |
| 2,791,452 | 5/1957 | Watson | 285—382.7 X |
| 3,107,108 | 10/1963 | Greene | 285—341 |
| 3,239,247 | 3/1966 | Pickert | 285—348 X |
| 3,273,919 | 9/1966 | Billeter et al. | 285—341 X |

CARL W. TOMLIN, *Primary Examiner.*

EDWARD C. ALLEN, *Examiner.*

R. G. BERKLEY, *Assistant Examiner.*